(12) United States Patent
Vitaladevuni et al.

(10) Patent No.: US 8,861,872 B2
(45) Date of Patent: Oct. 14, 2014

(54) IMAGE ANALYSIS USING COEFFICIENT DISTRIBUTIONS WITH SELECTIVE BASIS FEATURE REPRESENTATION

(71) Applicant: Raytheon BBN Technologies Corp., Cambridge, MA (US)

(72) Inventors: Shiv N. Vitaladevuni, Cambridge, MA (US); Pradeep Natarajan, Cambridge, MA (US); Rohit Prasad, Acton, MA (US); Premkumar Natarajan, Sudbury, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 157 days.

(21) Appl. No.: 13/668,886

(22) Filed: Nov. 5, 2012

(65) Prior Publication Data

US 2014/0126817 A1    May 8, 2014

(51) Int. Cl.
*G06K 9/00* (2006.01)
*G06K 9/46* (2006.01)
*G06K 9/62* (2006.01)
*G06K 9/66* (2006.01)

(52) U.S. Cl.
CPC .................................. *G06K 9/6267* (2013.01)
USPC ........................... 382/224; 382/170; 382/190

(58) Field of Classification Search
CPC ............ G06K 9/6232; G06K 9/6255
USPC .......................................... 382/170, 190, 224
See application file for complete search history.

(56) References Cited

U.S. PATENT DOCUMENTS

| | | | | |
|---|---|---|---|---|
| 7,286,712 B2 * | 10/2007 | Lee et al. | ....................... | 382/248 |
| 2002/0143539 A1 * | 10/2002 | Botterweck | ................... | 704/255 |
| 2008/0170623 A1 * | 7/2008 | Aharon et al. | ........... | 375/240.22 |
| 2009/0046569 A1 * | 2/2009 | Chen et al. | .................... | 370/203 |
| 2013/0286208 A1 * | 10/2013 | Bala et al. | ..................... | 348/149 |

OTHER PUBLICATIONS

Zhang et al. ("Optimized feature extraction by immune clonal selection algorithm," IEEE World Congress on Computational Intelligence, Jun. 10-15, 2012, 6 pages).*
Wang et al. ("Target Detection for Hyperspectral Images Using ICA-Based Feature Extraction," IEEE International Conference on Geoscience and Remote Sensing Symposium, 2006, 850-853).*
Ailon et al., "Approximate Nearest Neighbors and the Fast Johnson-Lindenstrauss Transform," STOC '06, May 21-23, 2006.
Li et al., "Very Sparse Random Projections," KDD '06, Aug. 20-23, 2006.

* cited by examiner

*Primary Examiner* — Yubin Hung
(74) *Attorney, Agent, or Firm* — Occhiuti & Rohlicek LLP

(57) ABSTRACT

Distributional information for a set of α vectors is determined using a sparse basis selection approach to representing an input image or video. In some examples, this distributional information is used for a classification task.

22 Claims, 1 Drawing Sheet

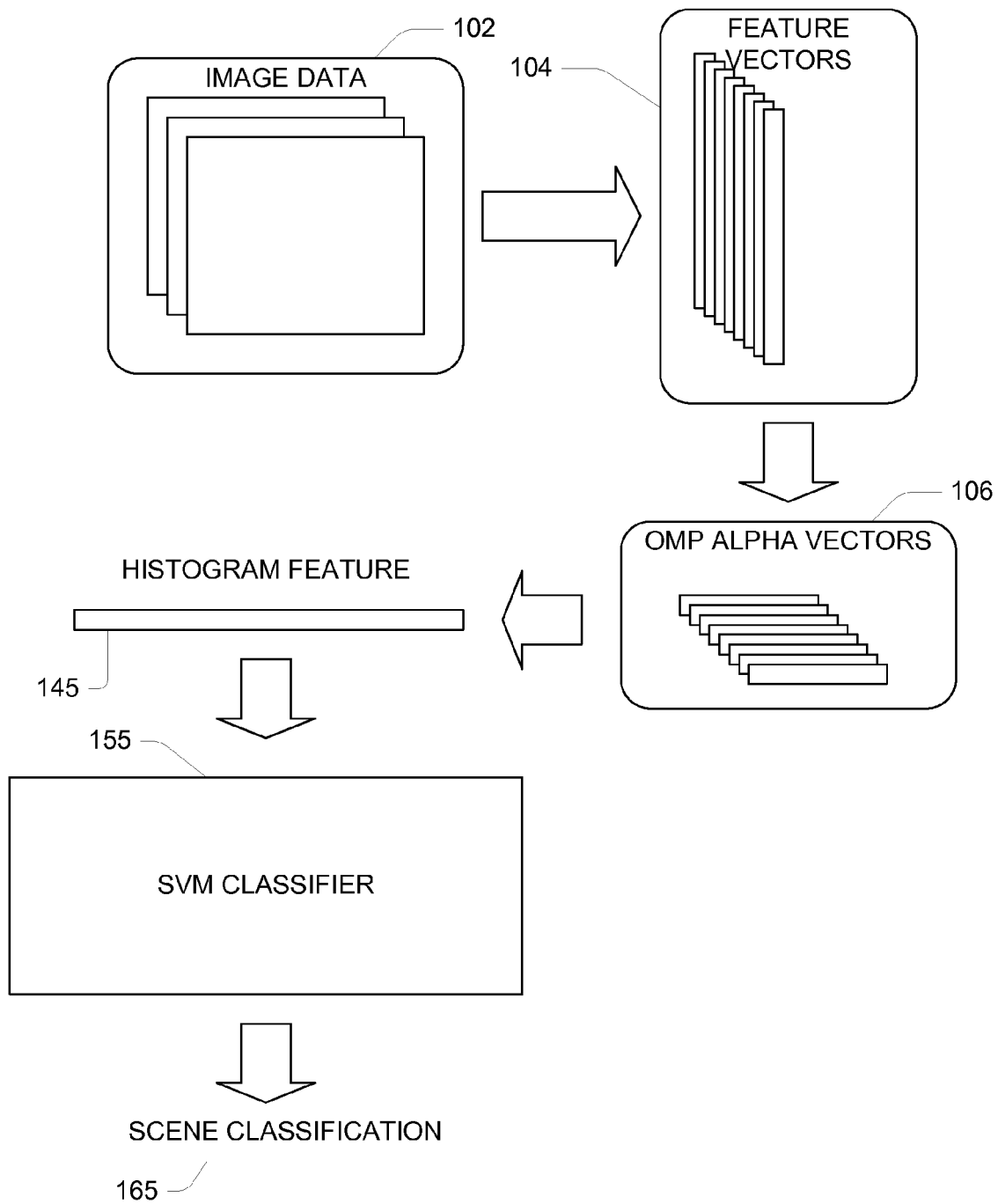

IMAGE ANALYSIS USING COEFFICIENT DISTRIBUTIONS WITH SELECTIVE BASIS FEATURE REPRESENTATION

BACKGROUND

This invention relates to image analysis using selective basis feature representations, and more particularly using histograms of coefficient values determined using Orthogonal Matching Pursuit processing of feature vectors.

A number of image and video analysis approaches involve computation of feature vector representations for an entire image or video, or portions (e.g., spatial patches) of such representations. One application of such features is classification based on collections of features, for example, scene classification using a collection of feature vectors determined from the image or video.

In some approaches to computation of feature vectors involves first computing a direct feature vector, for example, as a vector of pixel values or D-SIFT features, and then determining a representation of that direct feature vector in another basis using a projection approach. Projection approaches include basis selection approaches in which the basis vectors to represent a particular feature vector are selected from a larger predetermined "dictionary" of basis vectors. One such approach is called "Orthogonal Matching Pursuit (OMP)" in which a series of sequential decisions to add basis vectors for the representation are made. These decisions involve computations of inner products between the as-yet unselected basis vectors from the dictionary and a residual vector formed from the component of the feature vector not yet represented in the span of the selected basis vectors from the dictionary.

Generally, the OMP approach can be summarized as follows. A dictionary $\Phi=[a_i; i=1, \ldots, n]$ with $a_i \in \mathbb{R}^m$ such that $m \ll n$ and $\mathbb{R}^m = \mathrm{Span}(\Phi)$ is predetermined before processing the directly computed feature vectors, which have dimension m. Very generally, the OMP process involves an iteration selecting vectors $a_{k_1}, a_{k_2}, \ldots$ from the dictionary for representing a feature vector v such that at the $p^{th}$ iteration, $k_p$ is chosen such that $$k_p = \underset{k}{\mathrm{argmax}} |a_k^T v_{p-1}|$$

where $v_p$ is the residual $(I-P_{S_p})v$ where $P_{S_p}$ is a projection onto the span of $S_p=\{a_{k_1}, \ldots, a_{k_p}\}$, and $v_0=v$. The coefficients of the selected dictionary entries are selected to optimize $\|v-\Phi^T \alpha\|$ where $\alpha$ has non-zero entries at the selected elements $k_1, k_2, \ldots k_p$.

SUMMARY

In a general aspect, distributional information for a set of $\alpha$ vectors is determined using a sparse projection algorithm, for instance using a basis selection approach, to representing an input image or video. In some examples, this distributional information is used for a classification task, for example, a video scene classification task.

In another aspect, in general, a method for machine-implemented image feature processing includes accepting a data representation of a plurality of m dimensional feature vectors $x_s$ representing a processing of an image or video signal and accessing a dictionary of N basis vectors, where N>m. For each feature vector $x_s$, a representation the feature vector is formed using a selection of less than all of the basis vectors of the dictionary. The representation includes coefficients $\alpha_{s,n}$ corresponding to the selected basis vectors. For each dictionary basis vector n, a distribution characteristic of the coefficients $\alpha_{s,n}$ over the plurality of feature vectors is determined. The distribution characteristics of the plurality of basis vectors are combined to form a combine feature vector, which is then applied to a classifier to determine a classification of the image or video signal.

An advantage of one or more aspects is higher accuracy in classification than available using previously available techniques.

Other features and advantages of the invention are apparent from the following description, and from the claims.

DESCRIPTION OF DRAWINGS

FIG. 1 is a data flow diagram of a scene classification system.

DESCRIPTION

Referring to FIG. 1, a scene classification system 100 accepts input image or video data 102 (for example, acquired using a digital camera). The system processes this data form a set of m dimensional feature vectors $\{x_s\}$ 104. A predetermined dictionary of m-dimensional basis vectors $\Phi=[a_i; i=1, \ldots, n]$ is used to process the feature vectors such that each feature vector x is represented using a selected subset of basis vectors of the dictionary, $\{k_1, k_2, \ldots k_p\}$ as $$x_s \approx \sum_{i=1}^{n} \alpha_{s,i} a_i$$

where at most p of the $\alpha_i$ are non-zero, so that $$x_s \approx \sum_{j=1}^{p} \alpha_{s,k_p} a_{k_p}.$$

Note that generally p<m, so that the selected basis vectors do not span $\mathbb{R}^m$, and therefore the approximation leaves a residual.

A variety of approaches to selection of a basis for such a representation are known. As introduced above, one such approach is Orthogonal Matching Pursuit, which generally applied the following procedure:

```
p ← 0; v_0 ← x_s
α_{s,n} ← 0 for all n
repeat {
    p ← p + 1 k_p = argmax|a_k^T v_{p-1}|
            k determine α_{s,k_1}, ..., α_{s,k_p} to minimize ||v_p||_2 where v_p = x_s - ∑_{j=1}^{p} α_{s,k_p} a_{k_p}
}
```

Where the loop is repeated until a p reaches a predetermined value, the residual $v_p$ is below a predetermined magnitude, or some other predetermined stopping rule.

For a set of S feature vectors $x_s$, a set of $\alpha$ vectors 106, which include S×N alpha coefficients $\alpha_{s,n}$, is determined.

Next, these S×N coefficients are represented as N distributions, one for each dictionary element, and the characteristics of these N distributions are used as input to a scene classification module. In one embodiment, the observed range of coefficient values in the set $\{\alpha_{1,n}, \ldots, \alpha_{s,n}\}$ is divided into 10 uniform bins, and a histogram of the counts of the number of the coefficient values is formed. In some implementations, the histograms for the N dictionary entries are concatenated to form an overall fixed-length histogram feature vector 145 (e.g., with 10N entries if histograms with 10 bins are used).

Note that the majority of these coefficients are zero (i.e., for feature vectors in which that dictionary item was not selected) or near zero (e.g., when the dictionary item was selected late in the iteration of basis selection). Therefore in some implementations, a number of histogram bins near zero are omitted from the concatenation. For example, the center 3 bins of the 10 bins are omitted such that 7 histogram values are retained for each dictionary item, for a concatenated vector with 7N elements. Thus, for a N=2048 dictionary, the α-histogram feature for each video gives a 2048×7=14336 dimensional vector. In some examples, the histograms are normalized either before or after censoring the center bins.

Note that the uniform bin histogram is only one example of a fixed-length characterization of the distribution characteristics of an alpha coefficients. Other characteristics may be used alone or in combination, including for instance non-uniform bin histograms, percentile locations or other order statistics, moments, and entropy, each computed optionally with censoring the data near zero.

The fixed-length vector of distribution feature (e.g., censored histograms) is applied to a classifier 155 to determine the classification 165 of the scene. In one embodiment, the classifier uses a linear kernel support vector machine (SVM), but it should be understood that other forms of classifier can be used as well.

In one experimental application of the approach described above a video dataset consisting of 2785 videos collected from You Tube was partitioned into 9 categories: Baking, Shelter, Baseball-Cricket, Sports, Protest, War-footage, Military-parade, Traffic and Robbery. The videos had high variability in style and content. For the evaluation, 35 videos were randomly sampled from each category and used for training, the remaining videos were used for testing. This was repeated for 10 randomized iterations. The classification results are averaged for presentation. A SIFT descriptor is used to as the initial feature vector for each video. The OMP procedure described above is used to determine the α vector for each video. The dictionary is a set of 2048 basis vectors learned from a held-out set of data (i.e., this data was distinct from the sets used train and test the SVMs in the experiments).

In this experiment, the classification accuracy was 67%, which exceeded corresponding accuracy processing the a vectors using a mean, max, of K-means approach.

Further examples, applications, and comparisons to other techniques are found in "Efficient Orthogonal Matching Pursuit using sparse random projections for scene and video classification," *Proc.* 2011 *IEEE International Conference on Computer Vision (ICCV)*, 6-13 Nov. 2011, pp 2312-2319, which is incorporated herein by reference.

In some embodiments, efficient implementation of selective basis representation (e.g., using OMP) makes use of techniques described in copending application Ser. No. 13/668,582, published as US 2014/012824 A1, titled "EFFICIENT INNER PRODUCT COMPUTATION FOR IMAGE AND VIDEO ANALYSIS", which is incorporated herein by reference.

Implementations of the approach described above can include software, hardware, or a combination of hardware and software. Software can include instructions for causing a data processing system to perform steps of the approaches. The data processing system can include a special-purpose processor, a general purpose processor, a signal processor, etc. The instructions can be machine-level instructions, or may be represented in a programming language, which may be compiled or interpreted. The software may be stored on a non-transitory medium (e.g., a volatile or non-volatile memory). In some examples, a system includes image acquisition modules, feature extraction modules, and/or feature extraction modules integrated together with the feature processing involving inner product implementations as described above. Some such examples may include integration within a single integrated circuit or multi-chip module. In some examples, a data representation in a hardware description language (e.g., Verilog) of circuitry for implementing an approach described above may be stored on a non-transitory medium and provided to impart functionality on a device specification system that is uses as part of a process of designing and manufacturing integrated circuits embodying the approach.

It is to be understood that the foregoing description is intended to illustrate and not to limit the scope of the invention, which is defined by the scope of the appended claims Other embodiments are within the scope of the following claims.

What is claimed is:

1. A computer-implemented method for automated image feature processing comprising:
    accepting a data representation of a plurality of m dimensional feature vectors $x_s$ representing a processing of an image or video signal;
    accessing a dictionary of N basis vectors, where N>m;
    for each feature vector $x_s$, forming using a computer a representation of the feature vector using a selection of less than all of the basis vectors of the dictionary, the representation including coefficients $\alpha_{s,n}$ corresponding to the selected basis vectors;
    for each dictionary basis vector n, determining using a computer distribution characteristics of the coefficients $\alpha_{s,n}$ over the plurality of feature vectors;
    combining the distribution characteristics corresponding to the plurality of basis vectors to form a combined feature vector;
    applying the combined feature vector to a computer-implemented classifier to determine a classification of the image or video signal.

2. The method of claim 1 wherein the feature vectors comprise feature vectors determined from a plurality of frames of a video signal.

3. The method of claim 1 wherein forming the representation the feature vector using a selection of less than all of the basis vectors of the dictionary comprises applying a sparse projection approach.

4. The method of claim 2 wherein the sparse projection approach comprises a sequential basis selection procedure.

5. The method of claim 4 wherein applying the sequential basis selection procedure comprises applying an orthogonal matching pursuit procedure.

6. The method of claim 1 wherein the distribution characteristics of the coefficients $\alpha_{s,n}$ comprises a histogram.

7. The method of claim 6 wherein combining the distribution characteristics comprises combining the histograms as a concatenation.

8. The method claim 6 wherein combining the distribution characteristics comprises combining a predetermined subset of parts of each of the histograms.

9. The method of claim 8 wherein the predetermined subset of parts of each histogram omits a range of coefficient values including zero.

10. The method of claim 1 wherein applying the combined feature vector to a classifier includes applying the combined feature vector to a classifier trained on a predetermined plurality of classes of input image or video data.

11. The method of claim 1 further comprising presenting the classification of the image or video on computer display.

12. The method of claim 1 further comprising acquiring and processing of the image or video signal to form the feature vectors.

13. An image processing system comprising:
a processor;
a memory storing instructions for causing said processor to perform an image feature processing process, said process comprising;
accepting a data representation of a plurality of m dimensional feature vectors $x_s$ representing a processing of an image or video signal;
accessing a dictionary of N basis vectors, where N>m;
for each feature vector $x_s$, forming a representation of the feature vector using a selection of less than all of the basis vectors of the dictionary, the representation including coefficients $\alpha_{s,n}$ corresponding to the selected basis vectors;
for each dictionary basis vector n, determining distribution characteristics of the coefficients $\alpha_{s,n}$ over the plurality of feature vectors;
combining the distribution characteristics corresponding to the plurality of basis vectors to form a combined feature vector;
applying the combined feature vector to a classifier to determine a classification of the image or video signal.

14. The system of claim 13 wherein the feature vectors comprise feature vectors determined from a plurality of frames of a video signal.

15. The system of claim 13 wherein the distribution characteristics of the coefficients $\alpha_{s,n}$ comprises a histogram.

16. The system of claim 13 wherein combining the distribution characteristics comprises combining the histograms as a concatenation.

17. The system of claim 13 wherein combining the distribution characteristics comprises combining a predetermined subset of parts of each of the histograms.

18. Software stored on a non-volatile machine-readable medium comprising instructions for causing a data processing system to perform an image feature processing process, said process comprising:
accepting a data representation of a plurality of m dimensional feature vectors $x_s$ representing a processing of an image or video signal;
accessing a dictionary of N basis vectors, where N>m;
for each feature vector $x_s$, forming a representation of the feature vector using a selection of less than all of the basis vectors of the dictionary, the representation including coefficients $\alpha_{s,n}$ corresponding to the selected basis vectors;
for each dictionary basis vector n, determining distribution characteristics of the coefficients $\alpha_{s,n}$ over the plurality of feature vectors;
combining the distribution characteristics corresponding to the plurality of basis vectors to form a combined feature vector;
applying the combined feature vector to a classifier to determine a classification of the image or video signal.

19. The software of claim 18 wherein the feature vectors comprise feature vectors determined from a plurality of frames of a video signal.

20. The software of claim 18 wherein the distribution characteristics of the coefficients $\alpha_{s,n}$ comprises a histogram.

21. The software of claim 18 wherein combining the distribution characteristics comprises combining the histograms as a concatenation.

22. The software of claim 18 wherein combining the distribution characteristics comprises combining a predetermined subset of parts of each of the histograms.

* * * * *